(12) United States Patent
Gharda

(10) Patent No.: US 9,540,514 B2
(45) Date of Patent: Jan. 10, 2017

(54) CARBAZOLE DIOXAZINE PIGMENT AND A METHOD FOR ITS PREPARATION

(71) Applicant: Keki Hormusji Gharda, Maharashtra (IN)

(72) Inventor: Keki Hormusji Gharda, Maharashtra (IN)

( * ) Notice: Subject to any disclaimer, the term of this patent is extended or adjusted under 35 U.S.C. 154(b) by 0 days.

(21) Appl. No.: 14/896,876

(22) PCT Filed: Jun. 11, 2014

(86) PCT No.: PCT/IN2014/000388
§ 371 (c)(1),
(2) Date: Dec. 8, 2015

(87) PCT Pub. No.: WO2014/199400
PCT Pub. Date: Dec. 18, 2014

(65) Prior Publication Data
US 2016/0137844 A1 May 19, 2016

(30) Foreign Application Priority Data

Jun. 11, 2013 (IN) .................. 1990/MUM/2013

(51) Int. Cl.
| | | |
|---|---|---|
| C07D 498/22 | (2006.01) |
| C08K 5/3417 | (2006.01) |
| C08K 5/3437 | (2006.01) |
| C09B 19/02 | (2006.01) |
| C09D 11/322 | (2014.01) |
| C09D 11/037 | (2014.01) |

(52) U.S. Cl.
CPC ............. *C09B 19/02* (2013.01); *C09D 11/037* (2013.01); *C09D 11/322* (2013.01)

(58) Field of Classification Search
CPC .... C07D 498/22; C08K 5/3417; C08K 5/3437
USPC ........................................................ 544/74
See application file for complete search history.

(56) References Cited

U.S. PATENT DOCUMENTS 4,345,074 A    8/1982 Hufnagel et al.

FOREIGN PATENT DOCUMENTS

WO    2008071585 A2    6/2008
WO    2012001708 A1    1/2012

OTHER PUBLICATIONS

International Search Report of PCT/IN2014/000388, Jan. 9, 2015.

*Primary Examiner* — Kahsay Habte
(74) *Attorney, Agent, or Firm* — Muncy, Geissler, Olds & Lowe, P.C.

(57) ABSTRACT

The present disclosure provides carbazole-dioxazine pigment of Formula I;

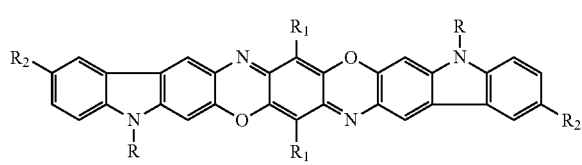

Formula I wherein,
R is $C_1$-$C_8$ alkyl group, preferably R is an ethyl group,
$R_1$ is a chloro group, and
$R_2$ is a —NHC(=O)Ph group.
The pigment is synthesized from 3-nitro-N-ethylcarbazole. The first step is nitration of 3-nitro-N-ethylcarbazole to form 3,6-dinitro-N-ethylcarbazole which is reduced to form 3-amino-6-nitro-N-ethylcarbazole. This amino compound is benzoylated to form 3-benzamido-6-nitro-N-ethylcarbazole which is then hydrogenated to form 6-amino-3-benzamido-N-ethylcarbazole. Condensation of 6-amino-3-benzamido-N-ethylcarbazole with chloranil provides an intermediate. Cyclization of the intermediate in the presence of a cyclization reagent provides the compound of Formula-I. The pigment has wavelength of maximum absorption ($\lambda_{max}$) at 571 nm in dimethylformamide as a solvent.

18 Claims, No Drawings

CARBAZOLE DIOXAZINE PIGMENT AND A METHOD FOR ITS PREPARATION

This application is a national stage of International Application No.: PCT/IN2014/000388, which was filed on Jun. 11, 2014, and which claims priority to IN 1990/MUM/2013 which was filed on Jun. 11, 2013, and which are both herein incorporated by reference.

FIELD OF DISCLOSURE

The present disclosure relates to a carbazole-dioxazine pigment.

BACKGROUND

Carbazole-dioxazine pigments are well known for their strong bluish-red to violet shade. These pigments have excellent heat resistance, light resistance and tinctorial strength. These pigments are used in the applications such as paint, plastic, inks, coatings and the like.

Pigment Violet 23 (PV-23) is the most important member of this class. Pigment violet-23 (carbazole violet) exhibits color range between bluish-red and violet shade.

However, there is felt a need for developing variants of carbazole-dioxazine pigment so as to exploit the inherent colour strength of carbazole-dioxazine chromophore with improvement in the pigmentory properties like viscosity, transparency, gloss, heat stability, color strength and durability properties relative to Pigment Violet 23.

OBJECT

Some of the objects of the present disclosure, which at least one embodiment herein satisfies, are as follows:

It is an object of the present disclosure to develop a new variant of carbazole-dioxazine pigment having improved pigmentory properties relative to Pigment Violet 23.

It is an object of the present disclosure to develop a new variant of carbazole-dioxazine pigment having higher molecular weight than Pigment Violet 23.

Other objects and advantages of the present disclosure will be more apparent from the following description which is not intended to limit the scope of the present disclosure.

SUMMARY

In accordance with the present disclosure, higher molecular weight variant of Pigment Violet 23 (PV-23) is produced by introduction of a benzamido group in each of the carbazole ring of PV-23. The carbazole-dioxazine pigment of the present disclosure is represented by Formula-I;

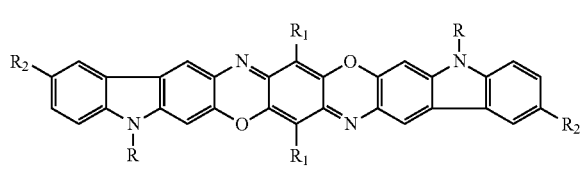

Formula-I wherein,
R is $C_1$-$C_8$ alkyl group, preferably R is an ethyl group,
$R_1$ is a chloro group, and
$R_2$ is a —NHC(=O)Ph group.

The pigment of Formula-I has maximum absorption wavelength ($\lambda_{max}$) at 571 nm in dimethylformamide as a solvent.

The pigment of Formula-I has molecular weight of 831, whereas the molecular weight of PV-23 is 589. The pigment of the present disclosure exhibits a reddish-violet shade. Pigment violet-23 exhibits color range between bluish-red and violet shade.

In accordance with another aspect of the present disclosure there is provided a process for the synthesis of the carbazole-dioxazine pigment of Formula-1; said process comprises the following steps;

(a) nitrating 3-nitro-N-ethyl-carbazole to form 3,6-dinitro-N-ethylcarbazole;

(b) reducing 3,6-dinitro-N-ethylcarbazole to form 3-amino-6-nitro-N-ethylcarbazole;

(c) benzoylating 3-amino-6-nitro-N-ethylcarbazole to form 3-benzamido-6-nitro-N-ethylcarbazole;

(d) hydrogenating 3-benzamido-6-nitro-N-ethylcarbazole to form 6-amino-3-benzamido-N-ethylcarbazole;

(e) condensing 6-amino-3-benzamido-N-ethylcarbazole and chlroanil to form an intermediate of Formula II; and

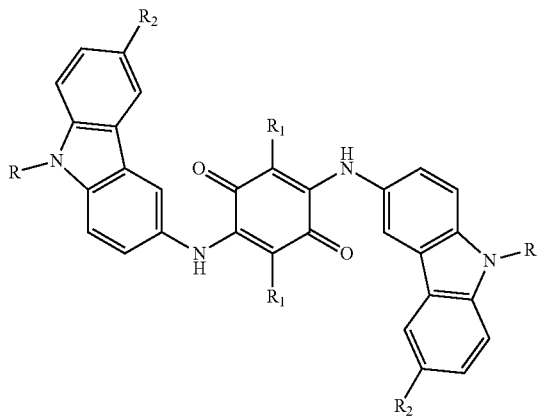

Formula II wherein, R is $C_1$-$C_8$ alkyl group, preferably R is an ethyl group,
$R_1$ is a chloro group, and
$R_2$ is a —NHC(=O)Ph group, (f) cyclizing the intermediate of Formula II using a cyclization reagent to obtain the pigment of Formula I.

DETAILED DESCRIPTION

The present disclosure provides a high molecular weight carbazole-dioxazine pigment and a method for its preparation.

In one aspect of the present disclosure there is provided a high molecular weight homologue of a carbazole-dioxazine pigment, Pigment Violet-23. Particularly, the present disclosure provides a novel pigment having one benzamido group in each carbazole ring of Pigment Violet-23, which is represented by Formula-I.

Formula I

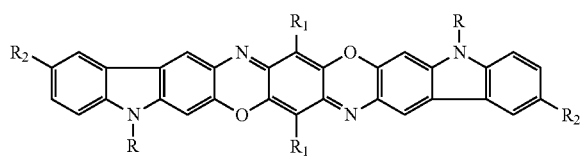

wherein,

R is $C_1$-$C_8$ alkyl group, preferably R is an ethyl group, $R_1$ is a chloro group, and $R_2$ is a —NHC(=O)Ph group.

The pigment of Formula-1 has maximum absorption wavelength ($\lambda_{max}$) at 571 nm in dimethylformamide as a solvent.

The pigment has molecular weight of 831, whereas the molecular weight of PV-23 is 589. In one exemplary embodiment of the present disclosure the pigment of the present disclosure is found to have the CIE attributes of lightness (L*): 56.43, chroma (C*): 19.03, hue (h*): 287.16 and colour (a*, b*): (5.615, −18.18) and exhibits a reddish-violet shade. Pigment violet-23 exhibits color range between bluish-red and violet shade.

In another aspect of the present disclosure there is provided a process for the synthesis of carbazole-dioxazine Pigment Violet 23 homologue of Formula-1.

The first step is nitration of 3-nitro-N-ethylcarbazole to form 3,6-dinitro-N-ethylcarbazole which is then reduced to form 3-amino-6-nitro-N-ethylcarbazole. This amino compound is further benzoylated to form 3-benzamido-6-nitro-N-ethylcarbazole which is hydrogenated to form 6-amino-3-benzamido-N-ethylcarbazole. Condensation of 6-amino-3-benzamido-N-ethylcarbazole with chlroanil provides an intermediate. Cyclization of the intermediate using a cyclization reagent provides the pigment of Formula-I.

In accordance with an exemplary embodiment, the process involves the following steps:

The first step (step-a) is nitration of 3-nitro-N-ethylcarbazole to form 3,6-dinitro-N-ethylcarbazole.

Step-a

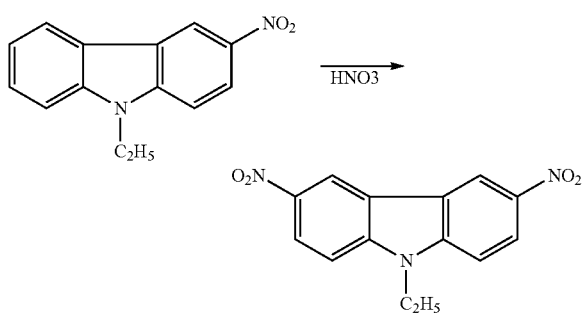

The nitration is carried out using nitric acid in the presence sodium nitrite and at least one solvent selected from a group consisting of monochlorobenzene and orthodichlorobenzene.

The nitration is carried out at a temperature ranging from 60 to 100° C.

In the next step (step-b), 3,6-dinitro-N-ethylcarbazole is reduced to form 3-amino-6-nitro-N-ethylcarbazole.

Step-b

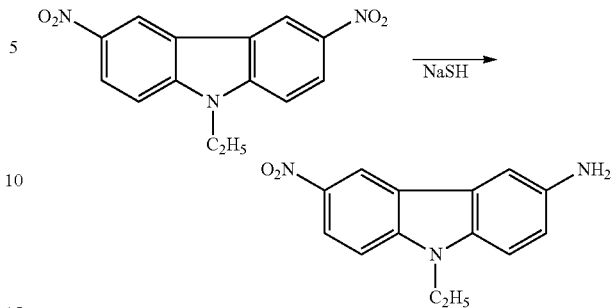

The reduction is carried out using sodium hydrosulfide and at least one solvent selected from a group consisting of ethanol and methanol.

The reduction is carried out at a temperature ranging from 55 to 80° C.

Third step (step-c) is benzoylation of 3-amino-6-nitro-N-ethylcarbazole to form 3-benzamido-6-nitro-N-ethylcarbazole.

Step-c

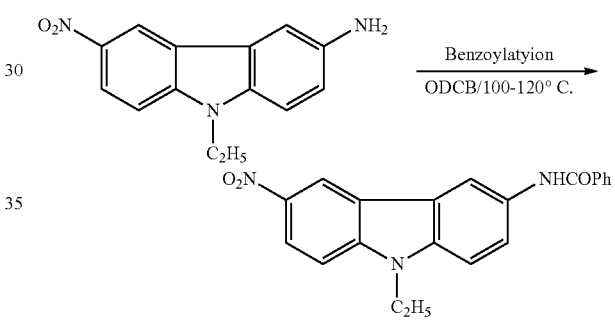

The benzoylation is carried out using benzoyl chloride and at least one solvent selected from a group consisting of o-dichlorobenzene and monochlorobenzene.

The benzoylation is carried out at a temperature ranging from 80 to 120° C.

The next step (step-d) is hydrogenation of 3-benzamido-6-nitro-N-ethylcarbazole to form 6-amino-3-benzamido-N-ethylcarbazole.

Step-d

The hydrogenation is carried out in the presence of raney nickel as a catalyst and sodium phosphate dibasic.

The hydrogenation is carried out in at least one solvent selected from a group consisting of dimethylacetamide and methanol.

The hydrogenation is carried out at a temperature ranging from 110 to 140° C. and at a pressure ranging from 10-20 Kg/cm².

In the next step (step-e), 6-amino-3-benzamido-N-ethylcarbazole and chlroanil are condensed to form an intermediate of Formula II.

Formula-II

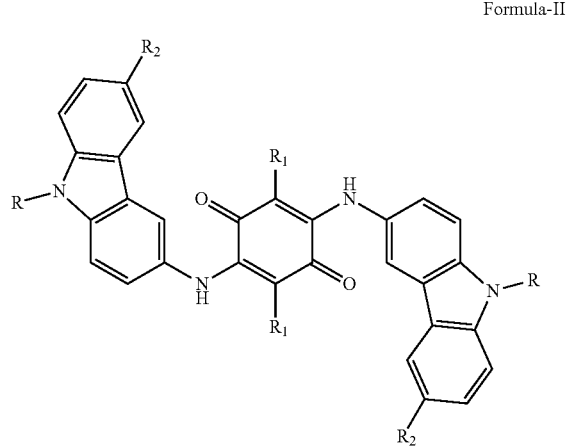

wherein, R is $C_1$-$C_8$ alkyl group, preferably R is an ethyl group, $R_1$ is a chloro group, and $R_2$ is a —NHC(=O)Ph group, The condensation is carried out using sodium acetate and at least one solvent selected from a group consisting of o-dichlorobenzene and monochlorobenzene. The condensation is carried out at a temperature ranging from 50 to 75° C.

The intermediate of Formula-II is cyclized in the presence of a cyclization reagent to obtain the pigment of Formula I (step-f).

Steps-e and f

The cyclization reagent used is benzenesulfonyl chloride. The cyclization is carried out in at least one solvent selected from a group consisting of o-dichlorobenzene, nitrobenzene.

The cyclization is carried out at a temperature ranging from 160 to 180° C.

All compounds in the synthetic scheme above are characterized by IR and NMR spectra. The pigment of Formula-1 is characterized by NMR, FTIR, GC-MS and elemental analysis.

The maximum visible absorption spectrum ($\lambda_{max}$) of the pigment of Formula-1 in dimethylformamide as a solvent is found at 571 nm. Further, the study of colour values of the pigment draw-downs are carried out. The CIE attributes of lightness (L*), chroma (C*), hue (h*) and colour (a*, b*) are determined by colorimetric assessment of pigment draw-down.

The disclosure is further illustrated with the help of following working example which should not be construed to limit the disclosure in any way.

Example 1

Preparation of PV-23 Homologue-II

Step a (Preparation of 3,6-dinitro-N-ethylcarbazole (DNEC)): 1440 gms (6.0 moles) of 3-Nitro-N-ethylcarbazole (NEC) was charged in to a reactor vessel containing monochlorobenzene (4800 ml) and 4.8 gms (0.069 moles) of sodium nitrite. The mixture was then stirred at a temperature of 30° C. 26 ml nitric acid (9.0 moles) was added to the mixture and the mixture was then heated to a temperature of 80° C. 800 ml of nitric acid was further added to the mixture over a period of 6-9 hours maintaining the temperature of 80° C. Reaction was continued at a temperature of 80° C. over a period 15-20 hours. The reacted mixture was then cooled, filtered, washed with mono-chlorobenzene followed by water and dried to yield 1245 gms of crude 3,6-Dinitro-N-ethylcarbazole (DNEC 93.1% and NEC-2.1%). Crude DNEC was purified by dissolving in nitrobenzene (~1 gm/ml of nitrobenzene) at a temperature of 160° C. followed by cooling and filtering to obtain a cake. Further, re-slurring the cake in methanol (~0.95 ml/gm of cake) at ambient temperature provided pure DNEC of purity 98.6%. The yield of dried product (DNEC) was 1109 gms (64.8%).

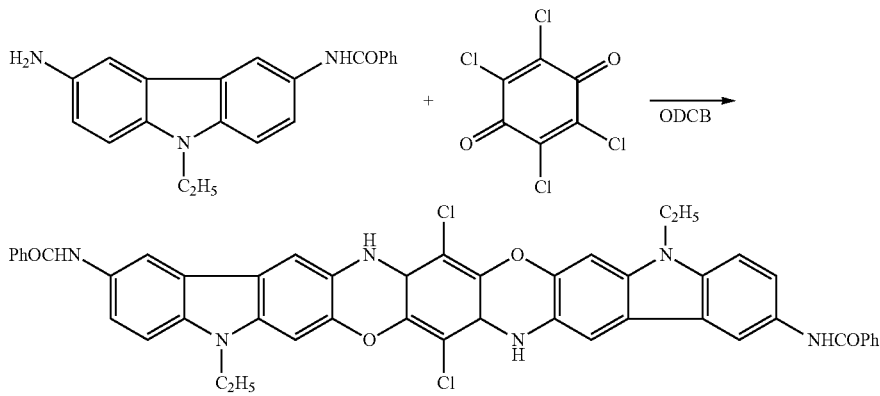

Molecular Formula = $C_{48}H_{36}Cl_2N_6O_4$
Formula Weight = 831.74324

Step-b (Preparation of 3-amino-6-nitro-N-ethylcarbazole): Sodium hydrosulfide (NaSH)-ethanol solution was prepared by vacuum drying 200 gm of 30% NaSH to remove water and treating it with 200 ml ethanol. To 150 ml of NaSH-ethanol solution so obtained, 100 gm of pure DNEC was charged and the mixture was heated to 70° C. Further quantity of 110 ml of NaSH ethanol solution was then added slowly to the mixture. Reaction was maintained at 70° C. for 6-7 hours to yield 50% of Aminonitroethylcarbazole (purity 98.3%, DNEC 0.2% and DAEC 0.3%). Elemental analysis of the product so obtained is as follows:

| Elemental | % C | % H | % N | % O |
|---|---|---|---|---|
| Theoretical | 65.8 | 5.09 | 16.4 | 12.6 |
| Observed | 65.8 | 4.7 | 16.4 | 13.2 |

Step-c (Benzoylation of 3-amino-6-nitro-N-ethylcarbazole): A mixture containing 43.2 gms (0.169 moles) of 3-amino-6-nitro-N-ethylcarbazole and 350 ml orthodichlorbenzene was heated to 100° C. 29 gms (0.203 moles) of benzoyl chloride was added to the mixture over a period of 1 hour and the reaction was continued at 100° C. During the reaction evolution of hydrochloric gas was observed. The reaction was carried out for 9-10 hours to yield 87% benzoylated derivative (3-nitro-6-benzoylamino ethyl carbazole) having purity 98.2%. Elemental analysis of the product so obtained is as follows:

| Elemental | % C | % H | % N | % O |
|---|---|---|---|---|
| Theoretical | 70.1 | 5.2 | 11.69 | 13.4 |
| Observed | 69.4 | 4.4 | 11.3 | 14.7 |

Step-d (Hydrogenation of 3-benzamido-6-nitro-N-ethylcarbazole): 50 gms (0.139 moles) of 3-nitro-6-benzoylamino-N-ethylcarbazole was hydrogenated in the presence of 600 ml of dimethylacetamide (DMAc), 10 g sodium phosphate dibasic and 20 gm (wet) Raney Nickel at a temperature of 125° C. and at a pressure of 10 Kg/cm$^2$ for a period of 10-11 hours to yield 82% of the crude hydrogenated product (purity 85-89%). Crude product was recrystallized from DMAc to yield hydrogenated product, 3-amino-6-benzoylamino ethyl carbazole of 95% purity. Molecular weight and structure was confirmed by MS, NMR and IR spectra.

Elemental analysis of the product so obtained is as follows:

| Elemental | % C | % H | % N |
|---|---|---|---|
| Theoretical | 76.59 | 6.38 | 12.67 |
| Observed | 76.65 | 5.46 | 11.96 |

Steps-e and f (Preparation of pigment of Formula-1): 50 gms of 3-amino-6-benzoylamino ethyl carbazole (0.145 moles) and ortho-dichlorobenzene (765 ml) were charged in a reactor vessel. To the mixture 24.3 gms (0.179 moles) of sodium acetate and 26.8 gm chloranil (0.109 moles) were added at a temperature of 40° C., the mixture was then stirred for a period of 10 minutes and heated further to 60° C. and maintained for a period of 4-6 hours. Reaction was monitored by TLC. After the completion of the reaction, acetic acid formed was removed along with ortho-dichlorobenzene by distillation at 100° C. and 600 mm Hg vacuum, over a period of 3-5 hours. After complete removal of acetic acid, fresh ortho-dichlorobenzene was added followed by addition of 17.2 gms of benzene sulfonyl chloride (0.097 moles). The addition was carried out drop-wise at 140° C. over a period of 20 min-1 hr. Temperature was slowly raised to 175° C. and maintained for a period of 6-7 hours to yield a cyclized product. The product mixture so formed was cooled to 90° C. and then isolated by filtration. The filtered product was washed with hot ortho-dichlorobenzene, methanol and finally with water and then dried in oven at 80° C. to yield 56 gm of crude pigment (88% yield). The product was characterized by $^1$H-NMR, elemental analysis and IR spectra. IR spectra showed absence of amino group. The elemental analysis results are shown in following table.

| Elemental | % C | % H | % N |
|---|---|---|---|
| Theoretical | 69.25 | 4.31 | 10.01 |
| Observed | 67.61 | 3.69 | 9.92 |

Example 2

Finishing

The dried crude pigment was kneaded with salt (sodium chloride) and DEG and treated with a solvent system containing isobutyl alcohol-water in the presence of caustic lye at a reflux temperature to yield reddish-violet shade of carbazole-pigment. The following table shows colorimetric assessment of pigment drawdown.

| | Illum* | L* | a* | b* | C* | h° |
|---|---|---|---|---|---|---|
| PV 23 homologue | D65 | 56.43 | 5.615 | −18.18 | 19.03 | 287.16 |

Example 3

Chemical Resistance Properties of PV-23 Homologue

| Properties | Result* |
|---|---|
| 1. Chemical Resistance to solvents (1-5 Gray scale) | |
|    1. Water | 5 |
|    2. t-Butanol | 5 |
|    3. xylene | 5 |
|    4. Methylethylketone (MEK) | 4 |
|    5. Toluene | 5 |
| 2. Chemical Resistance to Acid and alkali (1-5 Gray scale) | |
|    1. 2% acid | 5 |
|    2. 2% alkali | 5 |

*1-5—1 = poor, 5 = excellent

Technological Advancement

The technical advancements offered by the present disclosure include the realization of the following.

- The novel pigment of the present disclosure exhibits reddish-violet shade.
- The pigment has the desired chemical resistance (in 2% hydrochloric acid and 2% sodium hydroxide).
- The solvent fastness (water, xylene, methyethylketone, t-butanol, MEK, toluene, butyl acetate and mineral turpentine) of the pigment of the present disclosure is found very good to excellent.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the preferred embodiment, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A carbazole dioxazine pigment of Formula I;

Formula I

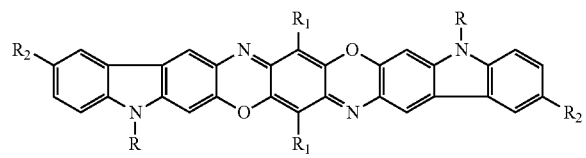

wherein,
R is $C_1$-$C_8$ alkyl group,
$R_1$ is a chloro group, and
$R_2$ is a —NHC(═O)Ph group.

2. The carbazole-dioxazine pigment of Formula I as claimed in claim 1, wherein said pigment has a wavelength of maximum absorption (λmax) at 571 nm in dimethylformamide as a solvent.

3. A process for synthesizing carbazole-dioxazine pigment as claimed in claim 1; said process comprising of the following steps;
   (a) nitrating 3-nitro-N-ethyl-carbazole to form 3,6-dinitro-N-ethylcarbazole;
   (b) reducing 3,6-dinitro-N-ethylcarbazole to form 3-amino-6-nitro-N-ethylcarbazole;
   (c) benzoylating 3-amino-6-nitro-N-ethylcarbazole to form 3-benzamido-6-nitro-N-ethylcarbazole;
   (d) hydrogenating 3-benzamido-6-nitro-N-ethylcarbazole to form 6-amino-3-benzamido-N-ethylcarbazole;
   (e) condensing 6-amino-3-benzamido-N-ethylcarbazole and chlroanil to form an intermediate of Formula-II; and Formula II

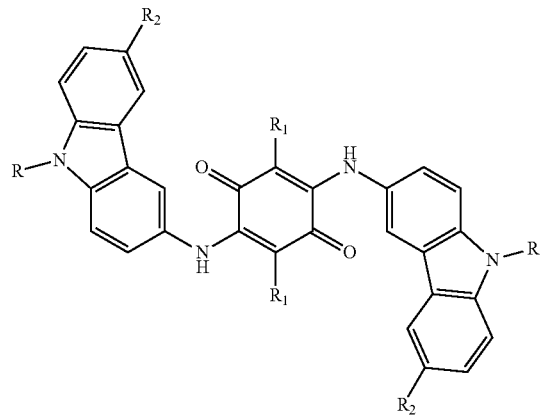

wherein,
R is $C_1$-$C_8$ alkyl group,
$R_1$ is a chloro group, and
$R_2$ is a —NHC(═O)Ph group,
   (f) cyclizing the intermediate of Formula-II using a cyclization reagent to obtain the pigment of Formula-I.

4. The process as claimed in claim 3, wherein the step (a) is carried out using nitric acid, in the presence sodium nitrite as a catalyst and at least one solvent selected from a group consisting of monochlorobenzene and orthodichlorobenzene.

5. The process as claimed in claim 3, wherein the step (b) is carried out using sodium hydrosulfide and at least one solvent selected from a group consisting of ethanol and methanol.

6. The process as claimed in claim 3, wherein the step (c) is carried out using benzoyl chloride and at least one solvent selected from a group consisting of o-dichlorobenzene and monochlorobenzene.

7. The process, as claimed in claim 3, wherein the step (d) is carried out in the presence of raney nickel as a catalyst and sodium phosphate dibasic.

8. The process as claimed in claim 3, wherein the step (d) is carried out in at least one solvent selected from a group consisting of dimethylacetamide and methanol.

9. The process as claimed in claim 3, wherein the condensation step is carried out using sodium acetate and at least one solvent selected from a group consisting of o-dichlorobenzene and monochlorobenzene.

10. The process as claimed in claim 3, wherein the cyclization reagent used is benzenesulfonyl chloride and the cyclization step is carried out in at least one solvent selected from a group consisting of o-dichlorobenzene and nitrobenzene.

11. The process as claimed in claim 3, wherein the step (a) is carried out at a temperature ranging from 60 to 100° C.

12. The process as claimed in claim 3, wherein the step (b) is carried out at a temperature ranging from 55 to 80° C.

13. The process as claimed in claim 3, wherein the step (c) is carried out at a temperature ranging from 80 to 120° C.

14. The process as claimed in claim 3, wherein the step (d) is carried out at a temperature ranging from 110 to 140° C. and at a pressure ranging from 10 to 20 Kg/cm².

15. The process as claimed in claim 3, wherein the condensation step is carried out at a temperature ranging from 50 to 75° C.

16. The process as claimed in claim 3, wherein the cyclization step is carried out at a temperature ranging from 160° C. to 180° C.

17. The carbazole-dioxazine pigment of Formula I as claimed in claim 1, wherein R is an ethyl group.

18. The process as claimed in claim 3, wherein R is an ethyl group.

* * * * *